United States Patent
Roden et al.

[19]

[11] Patent Number: 5,970,701
[45] Date of Patent: Oct. 26, 1999

[54] RESTRICTED MOVEMENT CHAIN AND UNIVERSAL LINK THEREFOR

[76] Inventors: Garey Roden, 1068 Jewett Hill Rd., Apalachin, N.Y. 13732; Neil Payne, 315 Underwood Rd., Vestal, N.Y. 13850

[21] Appl. No.: 09/032,975

[22] Filed: Mar. 2, 1998

[51] Int. Cl.$^6$ .................................................. F16G 13/20
[52] U.S. Cl. ...................................... 59/78; 59/78.1; 59/84
[58] Field of Search .................................. 59/78, 78.1, 84

[56] References Cited

U.S. PATENT DOCUMENTS

| 3,930,587 | 1/1976 | Bliss | 59/78.1 |
| 4,600,817 | 7/1986 | Hackenberg | 59/78.1 |
| 5,332,865 | 7/1994 | Jensen | 59/78.1 |
| 5,638,672 | 6/1997 | Furukawa | 59/78.1 |
| 5,724,803 | 3/1998 | Pea | 59/78.1 |

FOREIGN PATENT DOCUMENTS

| 488036 | 1/1976 | U.S.S.R. | 59/78.1 |
| 1250860 | 10/1971 | United Kingdom | 59/78 |

*Primary Examiner*—David Jones
*Attorney, Agent, or Firm*—Salzman & Levy

[57] ABSTRACT

The present invention features a chain of serially connected, universal links. The chain is movable in one direction, but restricted in movement in the opposite direction. The chain consists of a number of substantially identical links. Each of the links has an elongated body portion with abutments at distal ends thereof. The abutments engage respective abutments of neighboring links. Connected to the body portion of each link are two leg portions. The two leg portions each have an aperture for receiving a pin. At least one of the leg portions may be bifurcated into two, substantially parallel sides. The two sides of one of the bifurcated leg portions are spaced apart from one another so as to contain the other leg portion of a neighboring link. This other leg portion may be solid. Each leg extends beyond the distal ends of the body portion, so that, when the links are connected to one another, the aperture of one of the legs is aligned with the aperture of a neighboring leg. Thus, a single pin can be inserted through two apertures for pivotally connecting the leg portions of respective links to one another, thereby connecting the links themselves together, serially. A flexible cable can be attached to the body portion of each link to provide rigidity when the chain is extended.

22 Claims, 5 Drawing Sheets

RESTRICTED MOVEMENT CHAIN AND UNIVERSAL LINK THEREFOR

RELATED PATENT

The present application is related to U.S. Pat. No. 5,626,013, granted May 6, 1997 to John R. Schneider, for CIRCLE-CRANE MATERIAL HANDLING SYSTEM, and hereby incorporated by reference.

FIELD OF THE INVENTION

The present invention pertains to a chain having a plurality of links and, more particularly, to a chain having inherent restriction of movement, and in which all of the chain links are substantially identical.

BACKGROUND OF THE INVENTION

For transporting items substantially horizontally, conveyor belts and other mechanisms typically require support structure on both ends of the conveying means. Unfortunately, the support scheme often requires additional floor space and/or complexity of apparatus. Moreover, due to the nature of such supported conveying means, the overall length is generally fixed. The foregoing constraints limit the flexibility of such conveying systems.

While the use of chains provides flexibility, there has been a long sought need to develop a chain that need not be supported on both ends.

U.S. Pat. No. 5,626,013, issued to Schneider, discloses a chain that, when unwound, forms a rigid, linear structure, but which can bend and be wound into a coil onto its take-up reel in the opposite direction. The chain consists of main links and pivot links, alternating with each other. Each link has abutments that restrict movement of its neighboring links in one direction, preventing them from progressing beyond the plane of operation.

A flexible chain and rigid bar combination is disclosed in U.S. Pat. No. 4,885,907, issued to Pappanikolaou. This chain bar requires separate locking mechanisms and a plurality of moving parts, which are susceptible to failure under load.

U.S. Pat. No. 1,004,575, issued to Jones, also addresses the support problem by providing hook prominences. Unfortunately, such prominences tend to catch on fabric and other extraneous objects. Moreover, no provision is made to accommodate the drive sprocket teeth which are normally expected to drive the chain when in use by engaging slots in the chain placed in line at regular intervals.

U.S. Pat. No. 553,650, issued to Kingsland, discloses a lock chain which is rigid only when first laid straight and then compressed end-to-end. Such a procedure is not conducive to modern material handling operations.

It would be advantageous to provide a conveying mechanism, such as a chain, which is self-supporting and locking in all but one direction, so that it may be wound when not in use.

It would also be advantageous to provide a chain that can be extended from a spool and that can remain rigid in one direction for purposes of deploying loads, maintaining the position of same, and/or doing useful work at a distance from the operator.

It would further be advantageous to provide a chain of serially connected, universal links, the chain being movable in one direction, but restricted in movement in the opposite direction.

It would also be advantageous to provide a universal link itself, engageable with neighboring links to form a chain of serially connected, universal links, so that the chain can be movable in one direction, for winding up and storing, but restricted in movement in the opposite direction.

SUMMARY OF THE INVENTION

In accordance with the present invention, there is provided a chain of serially connected, universal links. The chain is movable in one direction, but restricted in movement in the opposite direction. The chain consists of a number of substantially identical links. Each of the links has an elongated body portion with abutments at distal ends thereof. The abutments engage respective abutments of neighboring links. Connected to the body portion of each link are two leg portions. The two leg portions each have an aperture for receiving a pin. At least one of the leg portions is bifurcated into two, substantially parallel sides. The two sides of one of the bifurcated leg portions are spaced apart from one another so as to contain the other leg portion of a neighboring link. This other leg portion may be solid. Each leg extends beyond the distal ends of the body portion, so that, when the links are connected to one another, the aperture of one of the legs is aligned with the aperture of a neighboring leg. Thus, a single pin can be inserted through two apertures for pivotally connecting the leg portions of respective links to one another, thereby connecting the links themselves together, serially.

BRIEF DESCRIPTION OF THE DRAWINGS

A complete understanding of the present invention may be obtained by reference to the accompanying drawings, when considered in conjunction with the subsequent, detailed description, in which.

The invention will be better understood and become more apparent hereinafter with reference to the detailed description. For the sake of brevity, like elements and components bear the same numerical designations throughout the FIGURES.

DETAILED DESCRIPTION OF PREFERRED EMBODIMENT

The present invention is a chain of serially connected, universal links. The chain is movable in one direction, but restricted in movement in the opposite direction. The chain consists of a number of substantially identical links. Each of the links has an elongated body portion with abutments at distal ends thereof. The abutments engage respective abutments of neighboring links. Connected to the body portion of each link are two leg portions. The two leg portions each have an aperture for receiving a pin. At least one of the leg portions is bifurcated into two, substantially parallel sides. The two sides of one of the bifurcated leg portions are spaced apart from one another so as to contain the other leg portion of a neighboring link. This other leg portion may be solid. Each leg extends beyond the distal ends of the body portion, so that, when the links are connected to one another, the aperture of one of the legs is aligned with the aperture of a neighboring leg. Thus, a single pin can be inserted through two apertures for pivotally connecting the leg portions of respective links to one another, thereby connecting the links themselves together, serially.

Figure 1:
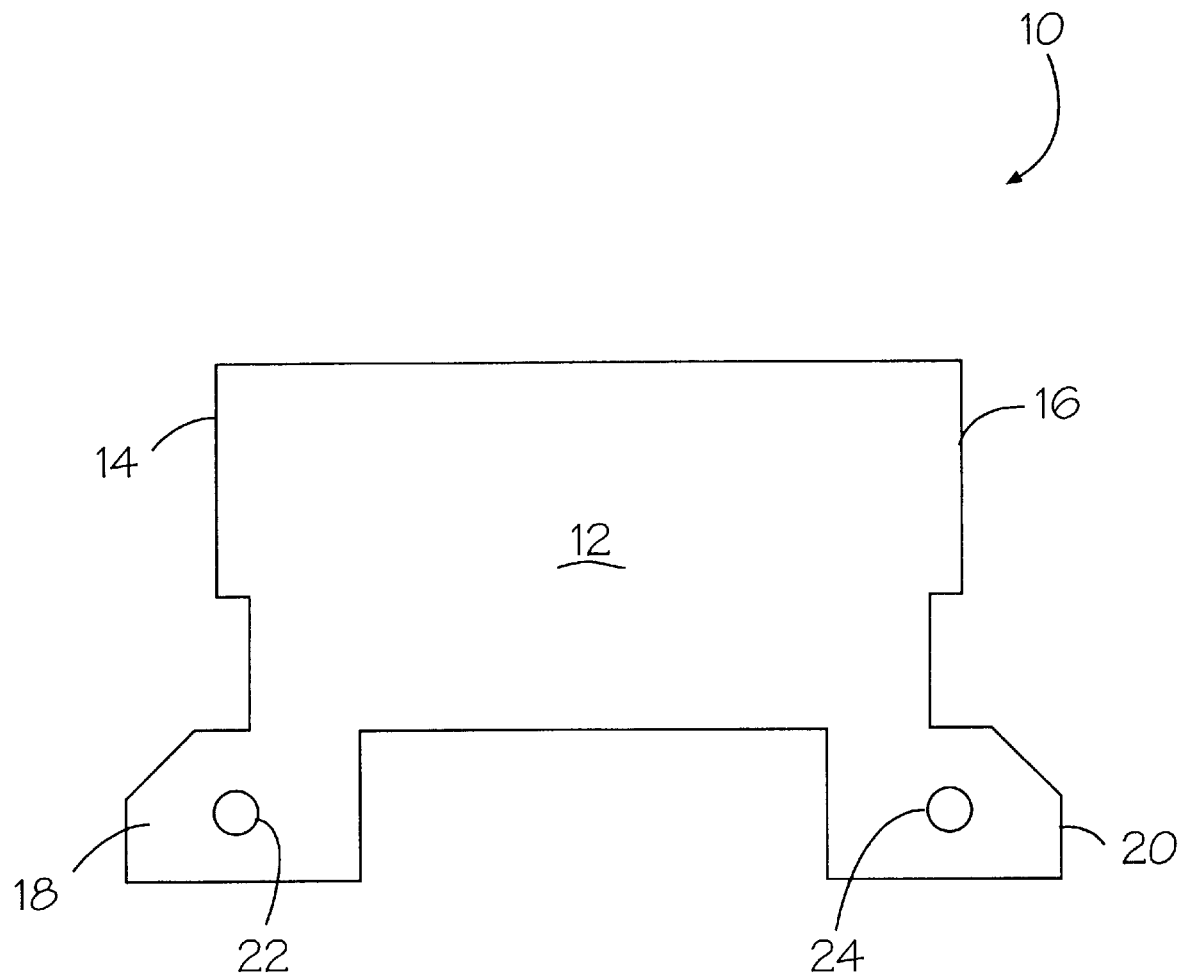
FIG. 1 is a side view of one, universal link in accordance with the present invention.

Now referring to FIG. 1, there is shown one universal link 10, in accordance with the invention. The link may be fabricated of metal, plastic, naturally occurring materials, composite, or any other known material, as is well known in the art, depending upon manufacturing cost considerations and applications of the product. An elongate body portion 12 has two abutting surfaces 14 and 16 at opposite distal ends. These surfaces 14 and 16 are designed to abut with corresponding surfaces on neighboring links (not shown), described hereinbelow.

Connected to body portion 12, preferentially as a unitary structure therewith, are leg portions 18 and 20, spaced apart from each other, again at the distal ends of body portion 12. Each leg portion 18 and 20 has an aperture or hole 22 and 24, respectively, punched, drilled, etched or formed completely through the leg portion 18 and 20, for receiving a pivot pin (not shown).

Figure 2:
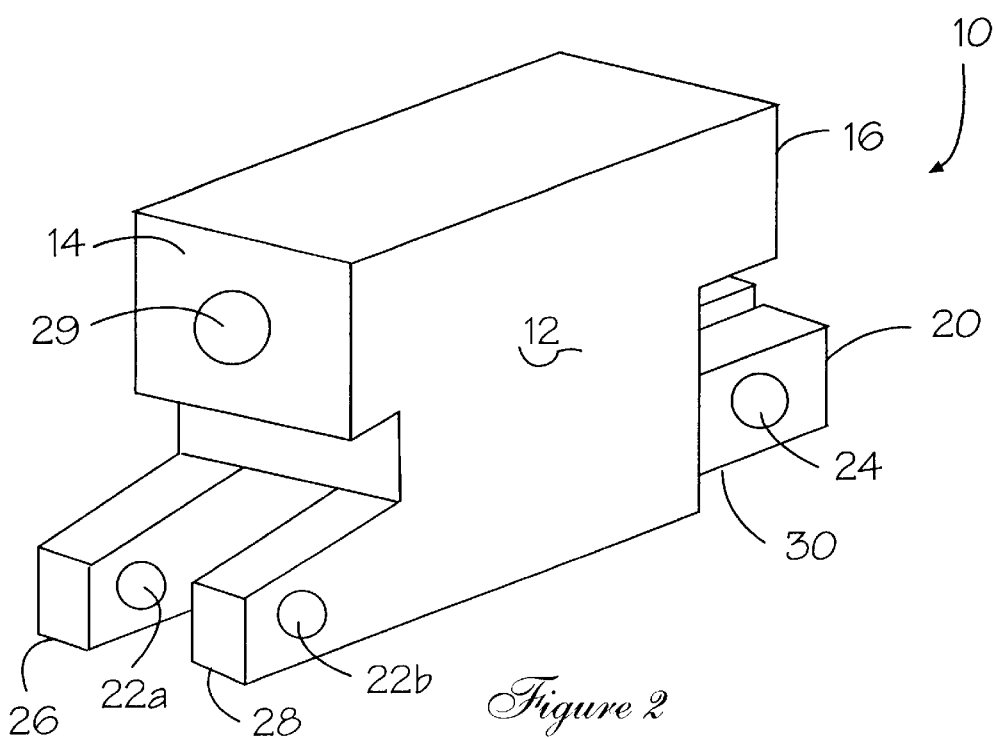
FIG. 2 is a perspective view of the universal link shown in FIG. 1.

Referring now also to FIG. 2, there is shown an enlarged, perspective view of the link 10 of FIG. 1. The leg portion 18 is shown bifurcated. Two substantially parallel sides 26 and 28 of leg portion 18 are connected to body portion 12, and each has a hole 22a and 22b, respectively, punched, drilled, etched or formed completely through the side.

A hole 29 is drilled entirely through the body 12 from one surface 14 to the other surface 16 of link 10. This hole 29 is intended to contain an optional, flexible cable (not shown), discussed in greater detail hereinbelow, which can be added to provide rigidity to the chain assembly.

Figure 3:
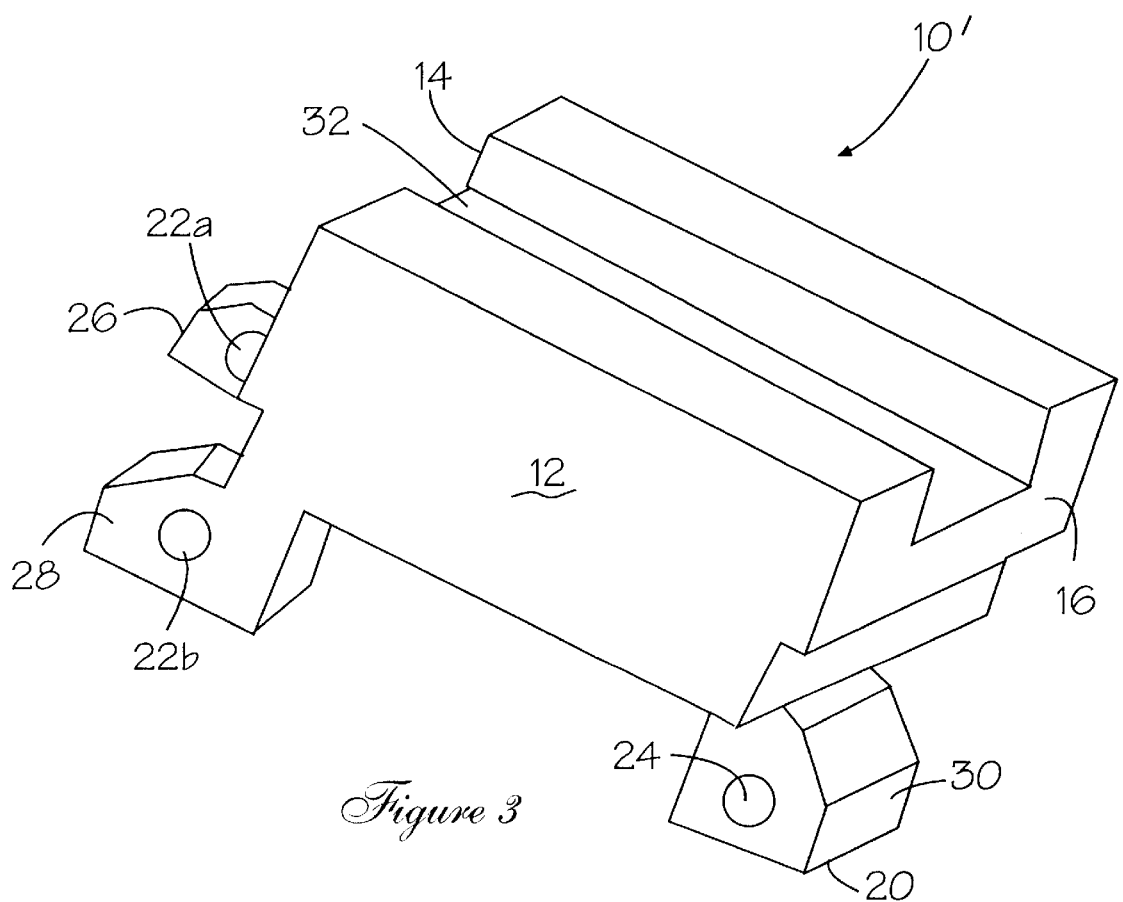
FIG. 3 is a perspective view of an alternate embodiment of a universal link in accordance with the present invention.

Referring now also to FIG. 3, another embodiment of the inventive link 10' is shown, in a perspective view, from a different angle. The lower extremity of leg portion 20 is a substantially solid member 30, recessed from the abutting surface 16, and having a hole 24 drilled or otherwise formed completely therethrough. The horizontal, outer dimension of lower extremity member 30 is slightly less than the inner dimension between inside parallel sides 26 and 28 (FIG. 2) of leg portion 18, in order for solid member 30 to fit between leg portions 26 and 28. Thus, sides 26 and 28 of one link 10 or 10' can surround, support and contain the lower extremity member 30 of a neighboring link (not shown). Moreover, holes 22a, 22b and 24 are designed to align with one another, so that a pivot pin (not shown) can be used to connect two links by being inserted from the outer surface of one of the sides 26 or 28, passing through the hole 24 in lower extremity member 30, and thence through the outer surface of the other of the sides 28 or 26.

Formed at the upper portion of body 12 of link 10' is a channel 32 which can be used to accommodate a flexible cable (not shown), described hereinbelow as aforementioned, which can be added to provide rigidity to the chain assembly, when extended. Channel 32 is shown with rectilinear surfaces, but it should be understood that any configuration can be used to guide and/or contain a flexible cable, as required.

Figure 4:
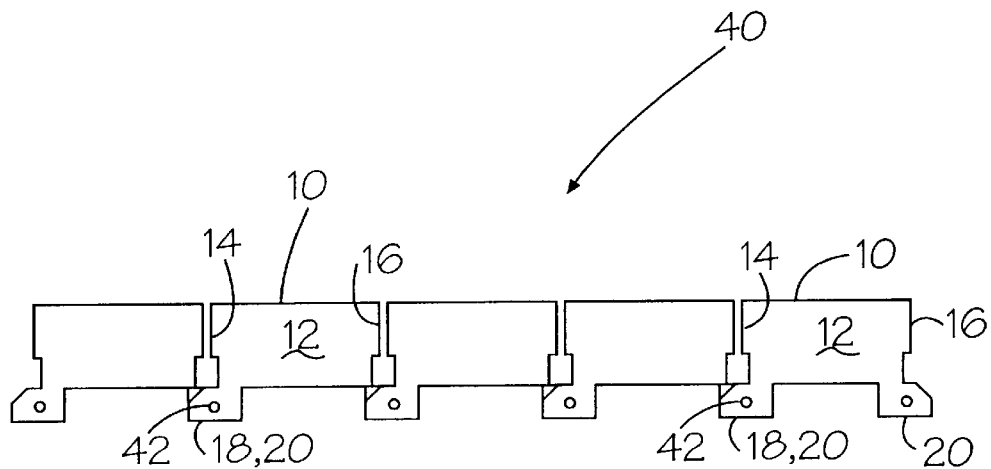
FIG. 4 is a side view of five links, as shown in FIG. 1, connected to form a segment of a chain in accordance with the present invention.
Figure 4A:
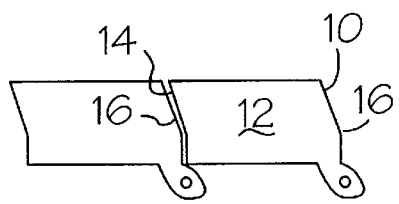
FIGS. 4a–4e are side views of links having configurations that are adaptable for various, respective orientations and functions with respect to one another.
Figure 4B:
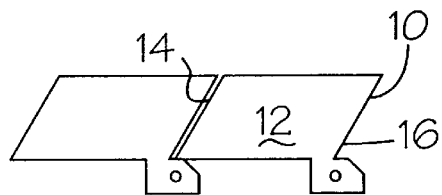
Figure 4C:
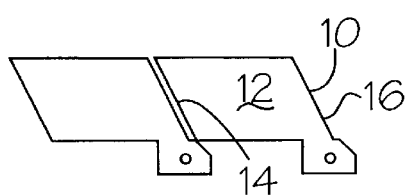
Figure 4D:
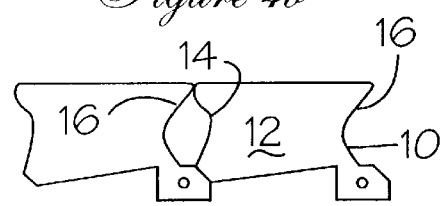
Figure 4E:
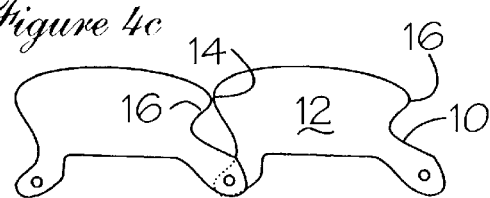

Referring now also to FIG. 4, there is shown a segment of a chain 40, comprising a plurality of individual, universal links 10, connected to one another at the leg portions 18, 20 thereof. Pins 42 are used to connect a leg portion 18 of one link 10 to a leg portion 20 of another link, through holes 22a, 22b and 24, as described above.

When the chain 40 is extended, the abutting surface 16 of each link 10, with the exception of the right-most link 10, contacts the abutting surface 14 of its neighboring link 10, with the exception of the left-most link 10, as shown. These abutting surfaces 14 and 16 prevent links 10 of chain 40 from pivoting in a counterclockwise direction. Thus, while chain 40 is inherently capable of being bent and wound in one direction (clockwise), as shown in FIG. 5, it is not capable of curling in the other direction (counterclockwise), beyond a straight line.

Referring to FIGS. 4a–4e, there are shown, respectively, portions of links 10 having various configurations. Abutting surfaces 14 and 16 are shown, respectively, at different angles in FIGS. 4a–4e, to indicate that the invention encompasses all configurations of link surfaces that abut with one another.

Figure 5:
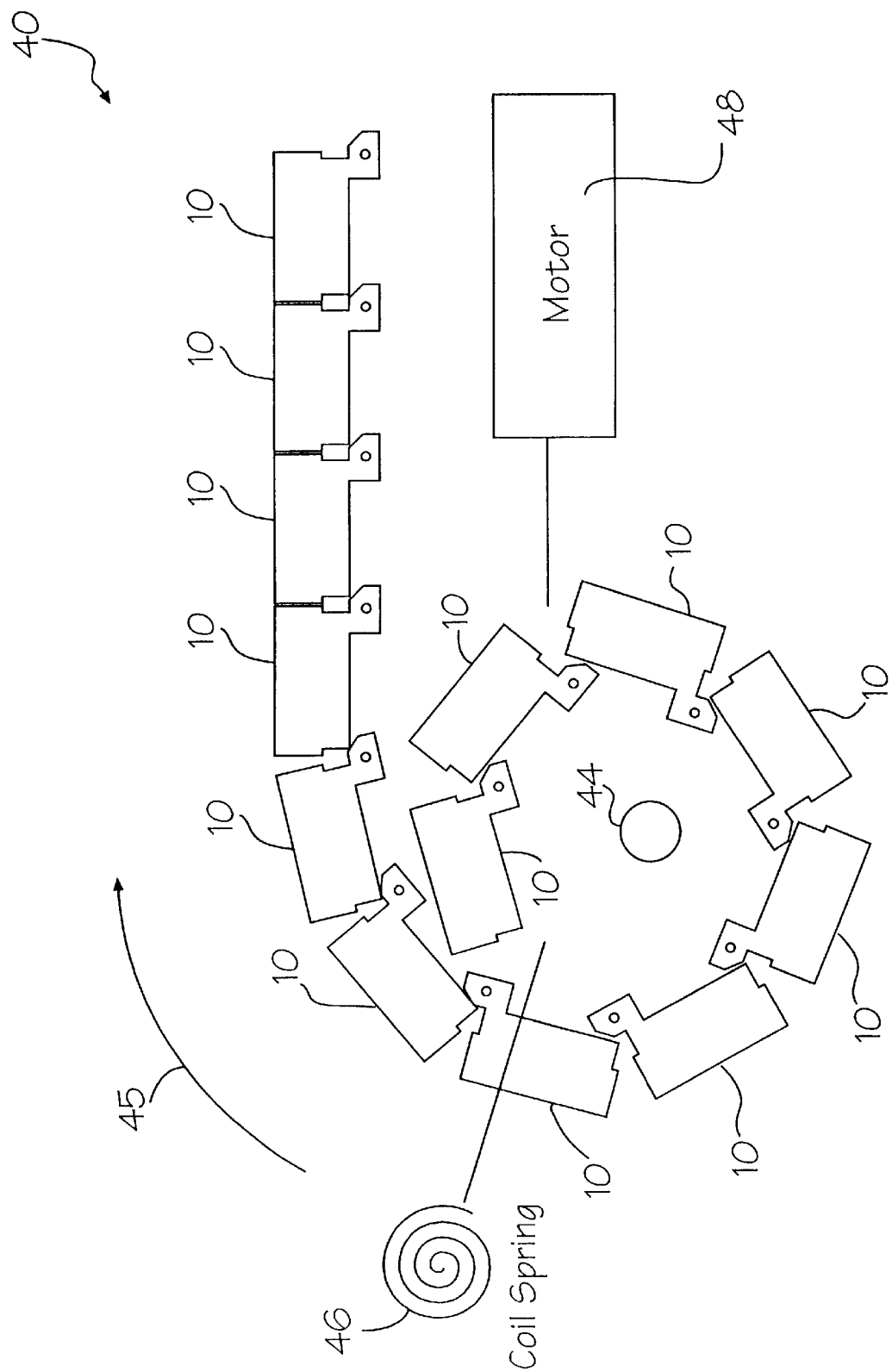
FIG. 5 is a side view of a chain segment wound on a spool with a schematic representation of an optional coil spring and an optional motor connected thereto.

Referring now to FIG. 5, the right-most portion of chain segment 40 is shown extended, as per FIG. 4, while the left-most portion of chain segment 40 is wound around a spool 44, in the clockwise direction, arrow 45. The diameter of the resulting, wound chain segment 40 is, of course, determined by the diameter of the spool 44 and the length of each universal link 10.

Optionally attached to wound chain segment 40, by suitable means well known in the art, is a spring 46 for retracting chain 40 quickly. This is a useful feature for tape measure applications and the like.

Also optionally attached to spool 44 of wound chain segment 40, by suitable means well known in the art, is a motor 48, which can be used to extend or retract chain 40. Motor 48 can be gas-operated or electric, depending upon the application of the invention, and can be controlled manually or automatically, as required.

Figure 6:
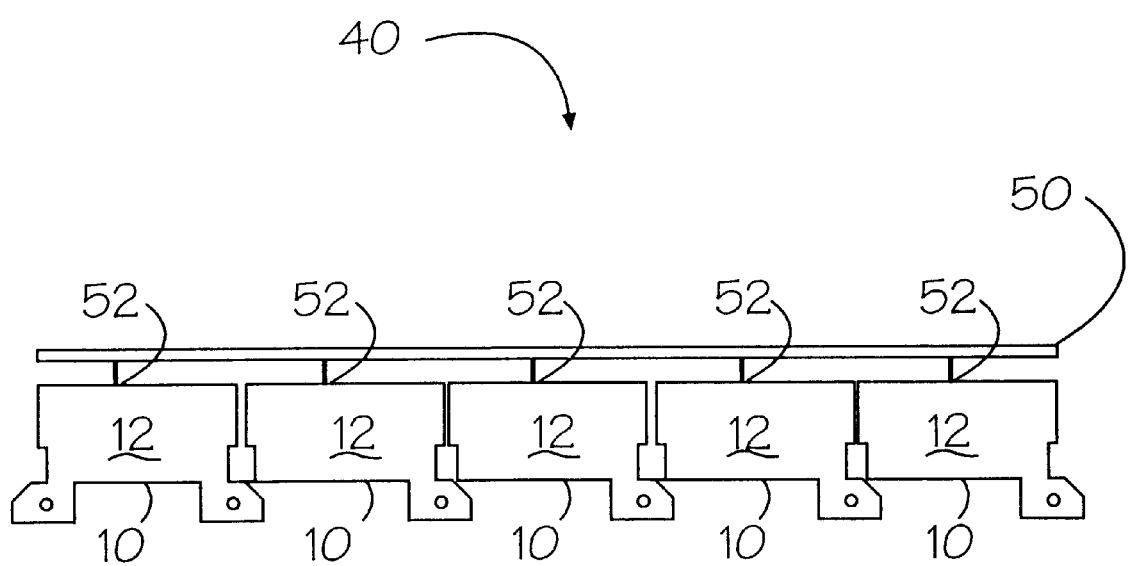
FIG. 6 is a side view of the chain segment shown in FIG. 4 having an optional stiffening cable connected thereto.

Referring now to FIG. 6, there is shown chain segment 40 in its extended configuration. A flexible cable 50 is optionally attached to chain 40 at connection points 52 on the body portion 12 of each link 10, for providing rigidity to chain 40, once extended. The cable 50 can be contained in, and supported and guided by an appropriately formed channel 32 (FIG. 3) or a lengthwise aperture 29 (FIG. 2). The cable 50, being flexible, can be wound or bent when the links 10 or 10' of the chain are retracted or wound for storage. When assembled, however, cable 50 prevents chain 40 from curling in a clockwise direction, while abutting surfaces 14 and 16 (FIG. 4) prevent chain 40 from rotating counterclockwise, as aforementioned. Thus, with cable 50 in place, chain segment 40 performs as a rigid beam that can be easily retracted, wound, and stored in a spool when cable 50 is removed. A configuration of links 10 having a channel below the body 12 and through the solid member leg portion 30 (not shown) can also be used to provide the same containment/guiding function for the cable 50 as shown in FIGS. 2, 3, and 6.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

In fact, the inventors have discovered numerous other uses for the link and chain hereinabove described, in the fields of material handling, microelectronic fabrication, ladders, fishing poles and downriggers, bicycles, surgical medicine, presentations, construction equipment such as chain saws, recreational equipment, etc. The chain may be used in many applications for which a need exists to deploy loads, to maintain the position of same, and/or to perform useful work at a distance from the operator.

Having thus described the invention, what is desired to be protected by Letters Patent is presented in the subsequently appended claims.

What is claimed is:

1. A chain of serially connected, universal links, the chain being movable in one direction, but restricted in movement in the opposite direction, the chain comprising:
   a) a plurality of substantially identical, unitary links, each of said links comprising:
      i) a substantially solid body portion having abutments at distal ends thereof to engage respective abutments of neighboring links, and
      ii) two leg portions operatively attached, in spaced apart relationship, to said substantially solid body portion of each of said links; and
   b) pivoting means for pivotally connecting one of said leg portion s of one of said links to the second of said leg portions of another of said links, thereby connecting said links together serially.

2. The chain of serially connected, universal links in accordance with claim 1, wherein said pivoting means comprises pins.

3. The chain of serially connected, universal links in accordance with claim 2, wherein each of said leg portions comprises an aperture for receiving said pins.

4. The chain of serially connected, universal links in accordance with claim 3, wherein said substantially solid body portion is elongated, and wherein each of said leg portions extends respectively beyond said distal ends of said substantially solid body portion, so that, when said unitary links are operatively connected to one another, said aperture of one of said legs is aligned with said aperture of a neighboring leg, whereby a single pin is disposed in said respective apertures for pivotally connecting two of said unitary links to each other.

5. The chain of serially connected, universal links in accordance with claim 4, wherein at least one of said leg portions is bifurcated into two substantially parallel sides.

6. The chain of serially connected, universal links in accordance with claim 5, wherein, when said unitary links are operatively connected to one another, said two sides of said at least one of said bifurcated leg portions are spaced apart from one another so as to contain said other leg portion of a neighboring unitary link.

7. The chain of serially connected, universal links in accordance with claim 6, wherein said other leg portion is substantially solid.

8. The chain of serially connected, universal links in accordance with claim 6, further comprising a cable operatively connected to said substantially solid body portion of at least one of said unitary links for providing additional rigidity and preventing movement in said opposite direction of said chain after extension thereof.

9. The chain of serially connected, universal links in accordance with claim 1, wherein said substantially solid body portion has a major plane disposed in a predetermined direction and said abutments are disposed substantially perpendicular to said predetermined direction of said major plane.

10. The chain of serially connected, universal links in accordance with claim 1, wherein said substantially sold body portion is elongated, and wherein each of said two leg portions extends respectively beyond said distal ends of said substantially sold body portion.

11. The chain of serially connected, universal links in accordance with claim 1, further comprising a cable in operative relationship with said substantially solid body portion of at least one of said unitary links for providing additional rigidity and preventing movement in said opposite direction of said chain after extension thereof.

12. The chain of serially connected, universal links in accordance with claim 1, further comprising a motor operatively connected to at least one of said unitary links for extending and retracting said chain.

13. The chain of serially connected, universal links in accordance with claim 1, wherein said chain is spring-loaded to facilitate retraction of said chain.

14. A universal link for a chain of serially connected, universal links, the chain being movable in one direction, but restricted in movement in the opposite direction, the link comprising:
   a) a substantially solid body portion having abutments at distal ends thereof t o engage respective abutments of neighboring unitary links; and
   b) two leg portions operatively attached, in spaced apart relationship, to said body portion of said unitary link.

15. The universal link in accordance with claim 14, wherein said substantially solid body portion has a major plane disposed in a predetermined direction and said abutments are disposed substantially perpendicular to said predetermined direction of said major plane.

16. The universal link in accordance with claim 14, wherein said body portion is elongated, and wherein each of said two leg portions extends respectively beyond said distal ends of said substantially solid body portion.

17. The universal link in accordance with claim 14, wherein each of said leg portions comprises an aperture for receiving pivoting pins.

18. The universal link in accordance with claim 17, wherein said substantially solid body portion is elongated, and wherein each of said leg portions extends respectively beyond said distal ends of said substantially solid body portion, so that, when two of said unitary links are operatively connected to one another, said aperture of one of said legs is aligned with said aperture of a neighboring leg, whereby a single pin may be disposed in said respective apertures for pivotally connecting said two unitary links to each other.

19. The universal link in accordance with claim 18, wherein at least one of said leg portions is bifurcated into two substantially parallel sides.

20. The universal link in accordance with claim 19, wherein, when said two links are operatively connected to one another, said two sides of said at least one of said bifurcated leg portions are spaced apart from one another so as to contain said other leg portion of a neighboring unitary link.

21. The universal link in accordance with claim 20, wherein said other leg portion is substantially solid.

22. The universal link in accordance with claim 14, wherein said substantially solid body portion comprises means for guiding and containing a cable, and further comprising a cable in operative relationship with said substantially solid body portion for providing additional rigidity and preventing movement in said opposite direction when a plurality of said universal unitary links forms a chain of serially connected unitary links.

* * * * *